US009692055B2

(12) United States Patent
Netz

(10) Patent No.: US 9,692,055 B2
(45) Date of Patent: Jun. 27, 2017

(54) BATTERY CELL HAVING A COATED ELECTRODE AND THE PRODUCTION THEREOF

(71) Applicant: Robert Bosch GmbH, Stuttgart (DE)

(72) Inventor: Andreas Netz, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 13 days.

(21) Appl. No.: 14/697,737

(22) Filed: Apr. 28, 2015

(65) Prior Publication Data

US 2015/0318551 A1 Nov. 5, 2015

(30) Foreign Application Priority Data

Apr. 30, 2014 (DE) .................... 10 2014 208 145

(51) Int. Cl.
| | | |
|---|---|---|
| H01M 4/04 | (2006.01) | |
| H01M 4/1395 | (2010.01) | |
| H01M 4/38 | (2006.01) | |
| H01M 4/62 | (2006.01) | |
| H01M 4/134 | (2010.01) | |
| H01M 4/36 | (2006.01) | |
| H01M 10/052 | (2010.01) | |

(52) U.S. Cl.
CPC ......... *H01M 4/628* (2013.01); *H01M 4/0402* (2013.01); *H01M 4/043* (2013.01); *H01M 4/134* (2013.01); *H01M 4/1395* (2013.01); *H01M 4/366* (2013.01); *H01M 4/382* (2013.01); *H01M 4/622* (2013.01); *H01M 10/052* (2013.01); *H01M 2220/20* (2013.01); *Y02E 60/122* (2013.01); *Y02P 70/54* (2015.11)

(58) Field of Classification Search
CPC .... H01M 4/0402; H01M 4/043; H01M 4/134; H01M 4/1395; H01M 4/366; H01M 4/382; H01M 4/622; H01M 4/628; H01M 10/052; H01M 2220/20; Y02E 60/122; Y02T 10/7011; Y02P 70/54
See application file for complete search history.

(56) References Cited

U.S. PATENT DOCUMENTS

2013/0157141 A1* 6/2013 Zhong ................... H01M 4/625
429/232
2013/0302666 A1* 11/2013 Park ....................... H01M 4/606
429/163

FOREIGN PATENT DOCUMENTS

| KR | 101190364 | 10/2012 |
| WO | 2012128460 | 9/2012 |

* cited by examiner

*Primary Examiner* — Brittany Raymond
(74) *Attorney, Agent, or Firm* — Michael Best & Friedrich LLP

(57) ABSTRACT

A battery cell (10) having a positive electrode (3) and a negative electrode (1), wherein the, in particular, negative electrode (1) comprises a coating (5) containing a polymer which contains catechol groups and the coating (5) is a dry coating, is described.

10 Claims, 3 Drawing Sheets

BATTERY CELL HAVING A COATED ELECTRODE AND THE PRODUCTION THEREOF

BACKGROUND OF THE INVENTION

The present invention relates to a battery cell having a coating of the, in particular, negative electrode and also to a process for producing the same.

A battery cell is an electrochemical energy store which on discharge converts the stored chemical energy into electric energy by means of an electrochemical reaction. It is apparent that in the future, both in the case of stationary applications such as wind power plants, in motor vehicles designed as hybrid or electric motor vehicles and also in electronic appliances, use will be made of new battery systems which will have to meet very demanding requirements in respect of reliability, safety, performance and life.

Owing to their high energy density, research has been carried out on, in particular, batteries having anode material composed of lithium as energy store for electrically powered motor vehicles.

US 20130302666 A1 describes the production of an active material for a lithium battery. The active material comprises lithium-metal oxide particles which are coated with polydopamine.

WO 2012/128460 A2 describes a process for producing a hydrophilic porous separator which is coated with a polydopamine layer by dipping into dissolved dopamine.

KR 101190364 B1 describes a negative electrode onto which, for example, a polydopamine layer has been applied by means of a dipcoating process. Here, the polydopamine is present in dissolved form.

SUMMARY OF THE INVENTION

The invention provides a battery cell having a positive electrode and a negative electrode, where the, in particular, negative electrode has a coating composed of a polymer which contains catechol groups and the coating is a dry coating, and a process for producing an, in particular, negative electrode having the coating.

A catechol group comprises a benzene ring bearing two hydroxy groups located in the ortho position.

During charging of a battery cell, dendritic precipitates, for example of lithium, can occur; these grow perpendicularly to the anode as dendrites on the anode and can push through elements located spatially subsequently, for example a separator arranged between the anode and the cathode, if they are not noticed in good time. This usually results in a short circuit.

The advantage of the coating according to the invention of an electrode, in particular an anode, composed of a polymer which contains catechol groups and is applied dry to the electrode is that it serves as protective layer and thus prevents the growth of dendrites. This increases the safety of the electrode and thus the safety of the battery cell or the battery.

Furthermore, the coating prevents undesired chemical reactions between the electrode and an electrolyte.

It is advantageous to apply the coating composed of a polymer containing catechol groups as dry solvent-free coating to the, in particular, negative electrode. In this way, undesired chemical reactions as would occur, for example, if a lithium anode were coated by means of dipcoating are prevented. In addition, the lithium would in this case be exposed to oxidants present in the coating solution during dipcoating, which would result in formation of undesired covering layers.

In a particularly advantageous embodiment, the negative electrode is made of metallic lithium or a lithium alloy.

A great advantage is the increase in the energy density achieved by the use of lithium as anode material. The capacity of the battery cell is therefore also significantly higher.

Some mollusks, for example, common mussels of the species *M. edulis*, secrete a sticky secretion which has a high proportion of polydopamine. Polydopamine is composed of dopamine molecules which form a film. This enables the mollusks to hold tightly onto any surfaces. This adhesive effect is produced, inter alia, via the catechol groups of polydopamine.

In one embodiment, it is advantageous to provide an electrode, in particular an anode, with a coating composed of polydopamine since the adhesive effect is firstly very strong, as a result of which dendrite formation is effectively prevented, and, secondly, polydopamine is also stable in an aqueous environment and also to organic solvents.

In one embodiment, it is advantageous for the coating to comprise the polymers polydopamine and polyethylene and/or polyethylene oxide, since the combination of these polymers enables thicker and thus stronger coatings having good adhesion, which prevent the formation of dendrites, to be realized.

Furthermore, it is advantageous for the coating composed of polydopamine and polyethylene and/or polyethylene oxide to have a thickness of at least 20 µm, since a high stability of the coating is achieved in this way.

In a further embodiment, it is particularly advantageous for a coating composed of the polymers polydopamine and also polyethylene and/or polyethylene oxide to replace a separator arranged between the negative electrode and the positive electrode. The coating then assumes, firstly, a protective function, for example against dendrite formation, and secondly serves to separate the electrode spaces. The production of the battery cell according to the invention, firstly, is carried out quicker and simpler and, secondly, costs such as materials and production costs can be saved.

A process for producing an, in particular, negative electrode having a coating, where the coating comprises a polymer containing catechol groups and the coating is applied dry to the, in particular, negative electrode, which comprises the following steps:
production of a pulverulent dry composition
pressing of the pulverulent dry composition to form a dry film
lamination of the dry film onto the, in particular, negative electrode and optionally
after-densification of the dry film,
is advantageous.

A dry coating process is advantageous compared to a wet coating process since, for example, no solvents which are harmful to health or toxic are used during pressing. Furthermore, the lamination operation is simple and inexpensive. Furthermore, a process for producing an, in particular, negative electrode having a coating, where the coating comprises a polymer containing catechol groups and the coating is applied dry to the, in particular, negative electrode, which comprises the following steps:
production of a pulverulent dry composition
coating of the, in particular, negative electrode with the pulverulent dry composition and optionally
after-densification of the dry coating,
is advantageous.

Here, the lamination step can be omitted, which additionally saves time and money.

BRIEF DESCRIPTION OF THE DRAWINGS

Embodiments of the present invention are shown in the drawing and explained in more detail in the following description of the figures. The figures show.

DETAILED DESCRIPTION

Figure 1:
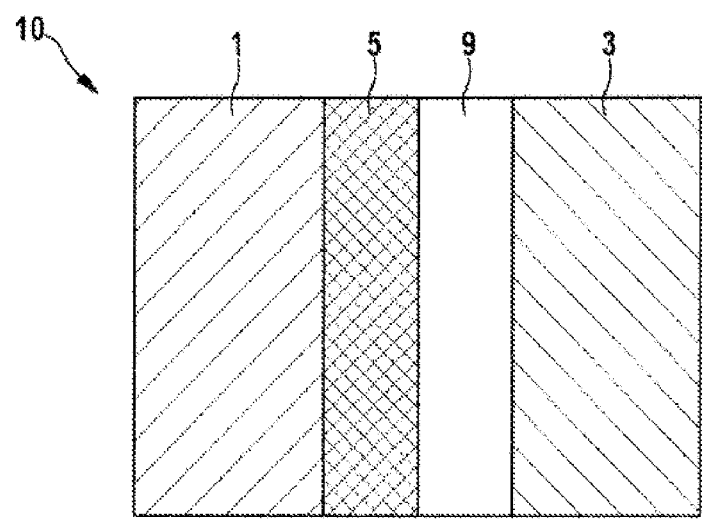
FIG. 1: a schematic depiction of a battery cell according to the invention having a positive electrode, a separator and a negative electrode which has a coating.

FIG. 1 shows a battery cell 10 having a positive electrode 3, a separator 9 and a negative electrode 1. The negative electrode 1 has a coating 5 composed of a polymer which contains catechol groups and has been applied dry to the negative electrode 1. An electrolyte which is not shown is used as ion conductor.

In addition or as an alternative, the positive electrode 3 can have a corresponding coating 5.

The polymer which contains catechol groups and has been applied dry to the negative electrode 1 is preferably polydopamine. In an alternative embodiment, the coating 5 contains the polymers polydopamine and polyethylene and/or polyethylene oxide.

Figure 2:
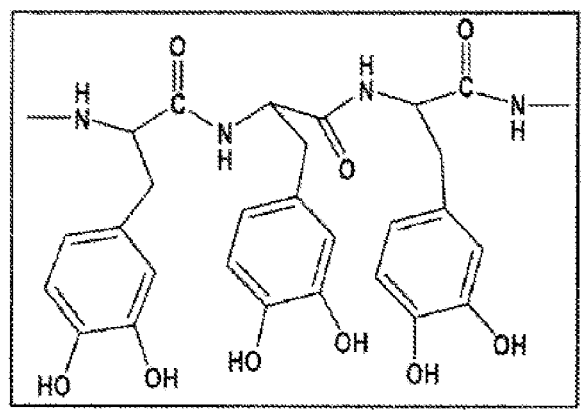
FIG. 2: a depiction of a section of the structural formula of polydopamine.

FIG. 2 shows a section of the structural formula of polydopamine. The three dopamine molecules depicted of the polydopamine are linked via peptide bonds.

Figure 3:
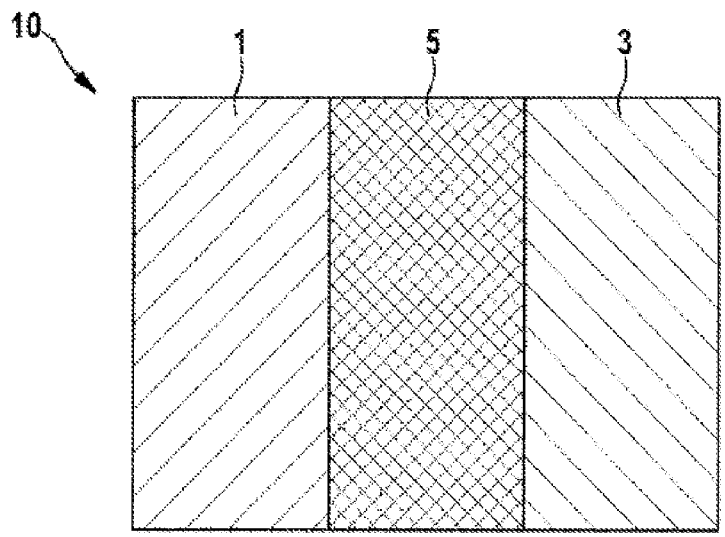
FIG. 3: a schematic depiction of a battery cell according to the invention having a positive electrode and a negative electrode which has a coating which replaces a separator.

FIG. 3 shows an alternative embodiment of the battery cell 10 according to the invention, having a positive electrode 3 and a negative electrode 1 which contains a coating 5 composed of a polymer which contains catechol groups and has been applied dry to the negative electrode 1. The coating 5 replaces the separator 9.

The polymer which contains catechol groups and has been applied dry to the negative electrode 1 is, for example, polydopamine. The coating 5 particularly preferably contains a combination of the polymers polydopamine and polyethylene and/or polyethylene oxide and in particular has a thickness of at least 20 μm.

Figure 4:
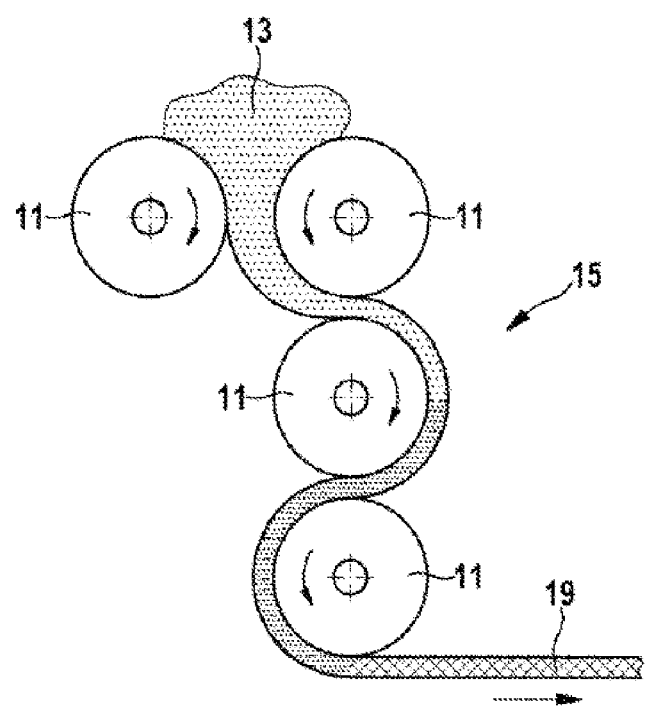
FIG. 4: a schematic depiction of a calender for producing a dry film.

FIG. 4 shows a calender 15 for producing the coating 5. The calender 15 comprises four rollers 11, for example steel rollers, which are preferably heated. The pulverulent dry composition 13 for the coating 5, which has been produced, for example, in a dry mixer, is introduced between the two uppermost rollers 11. The dry composition 13 is pressed by the rollers 11 to form a free-standing dry film 19. The dry composition 13 comprises, in one embodiment, polydopamine and a binder, for example polytetrafluoroethylene. In an alternative embodiment, the dry composition 13 contains a combination of the polymers polydopamine and also polyethylene and/or polyethylene oxide and a binder, for example polytetrafluoroethylene.

Figure 5:
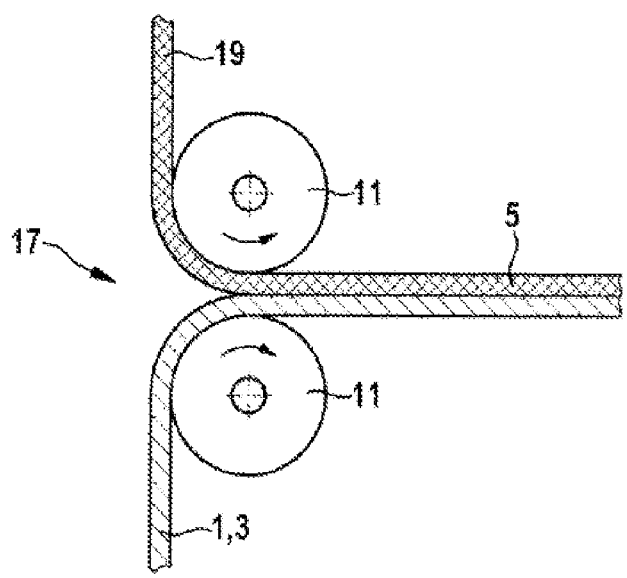
FIG. 5: a schematic depiction of an apparatus for lamination of an electrode with a dry film.

FIG. 5 shows an apparatus for the lamination 17 of an electrode 1, 3 having a dry film 19. The dry film 19 is laminated onto the electrode 1, 3 comprising a metal foil, for example composed of copper or aluminum, onto which the active material, for example metallic lithium or a lithium alloy, has been applied. For this purpose, the dry film 19 is applied to the electrode 1, 3, for example by exerting pressure of two rollers 11 onto the electrode 1, 3 and the coating 5, so that the dry film 19 forms the coating 5. The rollers 11 are preferably heated here.

As an alternative to the steps shown in FIG. 4 and FIG. 5, the electrode 1, 3 can also be coated directly with the pulverulent dry composition 13, for example in a calender 15.

After the coating 5 has been applied either directly as powder or by lamination of a dry film 19 to the electrode 1, 3, the coating 5 is, in particular, after-densified. The after-densification is carried out on a calender.

What is claimed is:

1. A battery cell (10) having a positive electrode (3) and a negative electrode (1), characterized in that one of the electrodes (1) has a coating (5) containing a polymer which contains catechol groups, where the coating (5) is a dry coating; and where the coating (5) comprises polydopamine and polyethylene and/or polyethylene oxide.

2. The battery cell (10) according to claim 1, characterized in that the one of the electrodes is the negative electrode (1).

3. The battery cell (10) according to claim 2, characterized in that the negative electrode (1) comprises metallic lithium.

4. The battery cell (10) according to claim 2, characterized in that the polymer having catechol groups is polydopamine.

5. The battery cell (10) according to claim 1, characterized in that the coating (5) has a thickness of at least 20 μm.

6. The battery cell (10) according to claim 1, characterized in that the coating (5) of the negative electrode (1) is arranged between the negative electrode (1) and the positive electrode (3) and replaces a separator (9).

7. A process for producing an electrode (1) of a battery cell (10) having a coating (5), wherein the coating (5) comprises a polymer containing catechol groups and the coating (5) is applied dry to the electrode (1), the process comprising the following steps:
   production of a pulverulent dry composition (13), wherein the pulverulent dry composition (13) comprises polydopamine and polyethylene and/or polyethylene oxide;
   pressing of the pulverulent dry composition (13) to form a dry film (19); and
   lamination of the dry film (19) onto the electrode (1) so that the dry film (19) forms the coating (5).

8. The process according to claim 7 wherein the electrode is a negative electrode.

9. A process for producing an electrode (1) of a battery cell (10) having a dry coating (5), wherein the dry coating (5) comprises a polymer containing catechol groups and the coating (5) is applied by means of a dry coating process to the electrode (1), the process comprising the following steps:
   production of a pulverulent dry composition (13), wherein the pulverulent dry composition (13) comprises polydopamine and polyethylene and/or polyethylene oxide;
   coating (5) of the electrode (1) with the pulverulent dry composition (13) so that this forms a dry coating (5); and
   after-densification of the dry coating (5).

10. The process according to claim 9 wherein the electrode is a negative electrode.

* * * * *